(12) United States Patent
Bailey et al.

(10) Patent No.: US 10,913,543 B2
(45) Date of Patent: Feb. 9, 2021

(54) POWER SYSTEM FOR MORE ELECTRIC AIRCRAFT

(71) Applicant: GE Aviation Systems Limited, Cheltenham (GB)

(72) Inventors: Michael David Bailey, Tewkesbury (GB); Colin John Halsey, Tewkesbury (GB)

(73) Assignee: GE Aviation Systems Limited, Cheltenham (GB)

(*) Notice: Subject to any disclaimer, the term of this patent is extended or adjusted under 35 U.S.C. 154(b) by 581 days.

(21) Appl. No.: 15/791,475

(22) Filed: Oct. 24, 2017

(65) Prior Publication Data
US 2018/0141674 A1 May 24, 2018

(30) Foreign Application Priority Data
Nov. 18, 2016 (GB) .................... 1619570.3

(51) Int. Cl.
H02J 7/00 (2006.01)
H01M 10/44 (2006.01)
(Continued)

(52) U.S. Cl.
CPC .......... B64D 41/00 (2013.01); H01M 8/0494 (2013.01); H01M 8/04201 (2013.01);
(Continued)

(58) Field of Classification Search
CPC .............. B64D 41/00; B64D 2041/005; B64D 2221/00; B64D 27/24; B64D 27/02;
(Continued)

(56) References Cited

U.S. PATENT DOCUMENTS 6,931,247 B2 8/2005 Cox et al.
7,550,866 B2 6/2009 Breit et al.
(Continued)

FOREIGN PATENT DOCUMENTS

CN 1420829 A 5/2003
CN 102224076 A 10/2011
(Continued)

OTHER PUBLICATIONS

Colin, J. H., et al., Power source for an aircraft, GE co-pending Application 1619401.1, filed Nov. 16, 2016.
(Continued)

*Primary Examiner* — Zixuan Zhou
(74) *Attorney, Agent, or Firm* — Dority & Manning, P.A.

(57) ABSTRACT

Systems and methods for providing power to one or more loads on an aircraft are provided. A power system for an aircraft can include a first fuel cell configured to provide base power to one or more loads on the aircraft. The power system can further include a second fuel cell configured to provide peak power to the one or more loads on the aircraft. The peak power can be a power exceeding the base power. The power system can further include an energy storage device configured to provide transient power to the one or more loads on the aircraft. The transient power can be a power exceeding the peak power. The power system can further include a controller configured to control delivery of power from the first fuel cell, the second fuel cell, and the energy storage device to the one or more loads on the aircraft.

20 Claims, 5 Drawing Sheets

(51) Int. Cl.
  *H01M 10/46* (2006.01)
  *B64D 41/00* (2006.01)
  *H01M 8/0612* (2016.01)
  *H01M 8/0656* (2016.01)
  *H01M 8/04082* (2016.01)
  *H01M 8/04828* (2016.01)
  *H01M 16/00* (2006.01)
  *H01M 8/086* (2016.01)
  *H01M 8/1018* (2016.01)
  *H01M 8/124* (2016.01)
  *H01M 8/083* (2016.01)
  *H01M 8/14* (2006.01)
  *H01M 8/18* (2006.01)

(52) U.S. Cl.
  CPC ....... *H01M 8/0612* (2013.01); *H01M 8/0618* (2013.01); *H01M 8/0656* (2013.01); *H01M 16/003* (2013.01); *B64D 2041/005* (2013.01); *B64D 2221/00* (2013.01); *H01M 8/083* (2013.01); *H01M 8/086* (2013.01); *H01M 8/184* (2013.01); *H01M 2008/1095* (2013.01); *H01M 2008/1293* (2013.01); *H01M 2008/147* (2013.01); *H01M 2250/20* (2013.01); *Y02E 60/50* (2013.01); *Y02T 50/50* (2013.01); *Y02T 90/40* (2013.01)

(58) Field of Classification Search
  CPC ......... Y02T 90/32; Y02T 90/36; Y02T 50/54; Y02E 60/525; Y02E 60/528; Y02E 60/526; H01M 8/184; H01M 2250/20; H01M 8/00; H01M 8/0612; H01M 8/0656; H01M 8/04201; H01M 8/0494; H01M 8/0618; H01M 16/003; H01M 8/086; H01M 2008/1095; H01M 2008/1293; H01M 8/083; H01M 2008/147; B64C 2201/042
  USPC .......................................................... 320/101
  See application file for complete search history.

(56) References Cited

U.S. PATENT DOCUMENTS

| | | | |
|---|---|---|---|
| 8,148,843 | B2 | 4/2012 | Sechrist |
| 2004/0081868 | A1* | 4/2004 | Edlund ............ H01M 8/04313 429/411 |
| 2012/0161512 | A1 | 6/2012 | Metzler et al. |
| 2014/0084817 | A1 | 3/2014 | Bhavaraju et al. |
| 2014/0126096 | A1 | 5/2014 | Luecken et al. |
| 2017/0141419 | A1* | 5/2017 | Wu .................. H01M 8/04805 |

FOREIGN PATENT DOCUMENTS

| | | |
|---|---|---|
| EP | 1 947 008 A1 | 7/2008 |
| JP | 2007-015423 A | 1/2007 |
| WO | 2014/182332 A1 | 11/2014 |

OTHER PUBLICATIONS

Lucken, A., et al., "Design and protection of a high voltage DC onboard grid with integrated fuel cell system on more electric aircraft," Electrical Systems for Aircraft, Railway and Ship Propulsion (ESARS), pp. 1-6 (Oct. 19-21, 2010) (Abstract).

Combined Search and Examination Report issued in connection with corresponding GB Application No. 1619570.3 dated May 17, 2017.

Chinese Office Action and Search Report Corresponding to Application No. 201711153557 dated Jul. 15, 2020.

\* cited by examiner

POWER SYSTEM FOR MORE ELECTRIC AIRCRAFT

FIELD OF INVENTION

The present subject matter relates generally to a power system for an aircraft, and more particularly, to a power system with an increased efficiency for a more electric aircraft.

BACKGROUND OF THE INVENTION

Electrical power on an aircraft is conventionally provided by generator(s) mechanically coupled to the aircraft engines, batteries, and in some cases, stand-alone electrical power generators, such as an Auxiliary Power Units (APUs). Emergency power, such as power needed to power the aircraft when all other power sources have failed, is often provided by a Ram Air Turbine (RAT), which can be deployed during flight to generate emergency electrical power. These conventional electrical power generating devices can together provide electrical power to meet the needs of the aircraft, including power for flight systems, power to the aircraft cabin, and any other power needs.

However, generating electrical power from these conventional electrical power generating devices on an aircraft in many cases can be inefficient. For example, an aircraft engine, such as a jet engine providing propulsion to the aircraft, may be most efficient at providing thrust when operated at particular operating conditions. However, a generator mechanically coupled to the aircraft engine may not generate electrical power at its peak efficiency at these same operating conditions. Conversion of the electrical power, such as conversion of mechanical energy or conversion of electrical power from a first form of electrical power to a second form of electrical power can further decrease efficiencies. Moreover, these generators, as well as APUs, can generate significant greenhouse emissions.

BRIEF DESCRIPTION OF THE INVENTION

Aspects and advantages of the present disclosure will be set forth in part in the following description, or may be learned from the description, or may be learned through practice of the examples disclosed herein.

One example aspect of the present disclosure is directed to a power system for an aircraft. The power system can include a first fuel cell configured to provide base power to one or more loads on the aircraft. The power system can further include a second fuel cell configured to provide peak power to the one or more loads on the aircraft. The peak power can be a power exceeding the base power. The power system can further include an energy storage device configured to provide transient power to the one or more loads on the aircraft. The transient power can be a power exceeding the peak power. The power system can further include a controller configured to control delivery of power from the first fuel cell, the second fuel cell, and the energy storage device to the one or more loads on the aircraft.

Another example aspect of the present disclosure is directed to a method of providing power to one or more loads on an aircraft. The aircraft can include a power system. The power system can include a first fuel cell configured to provide a base power, a second fuel cell configured to provide a peak power, and an energy storage device configured to provide a transient power. The peak power can be a power exceeding the base power. The transient power can be a power exceeding the peak power. The method can include determining, by one or more controllers, a power demand for the one or more loads on the aircraft. The method can further include determining, by the one or more controllers, one or more selected power sources from the power system needed to meet the power demand. The method can further include controlling, by the one or more controllers, the one or more selected power sources to provide power to the one or more loads on the aircraft. The first fuel cell can be a solid oxide fuel cell or a molten carbonate fuel cell. The second fuel cell can be a proton exchange membrane fuel cell, an alkaline fuel cell, a phosphoric acid fuel cell, or a direct methanol fuel cell. The energy storage device can be a battery, a capacitor, or a supercapacitor.

Yet another example aspect of the present disclosure is directed to an aircraft. The aircraft can include a fuselage, one or more wing assemblies, at least one engine configured for propulsion of the aircraft, and a power system. The power system can include a first fuel cell configured to provide base power to one or more loads on the aircraft. The first fuel cell can be a solid oxide fuel cell or a molten carbonate fuel cell. The one or more loads can be one or more high voltage loads, low voltage loads, or AC loads. The power system can further include a second fuel cell configured to provide peak power to the one or more loads on the aircraft. The peak power can be a power exceeding the base power. The second fuel cell can be a proton exchange membrane fuel cell, an alkaline fuel cell, a phosphoric acid fuel cell, or a direct methanol fuel cell. The power system can further include an energy storage device configured to provide transient power to the one or more loads on the aircraft. The transient power can be a power exceeding the peak power. The energy storage device can be a battery, a capacitor, or a supercapacitor. The power system can further include a controller configured to control delivery of power from the first fuel cell, the second fuel cell, and the energy storage device to the one or more loads on the aircraft.

Other example aspects of the present disclosure are directed to systems, methods, devices, and non-transitory computer-readable media for providing power to an aircraft.

Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate aspects of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
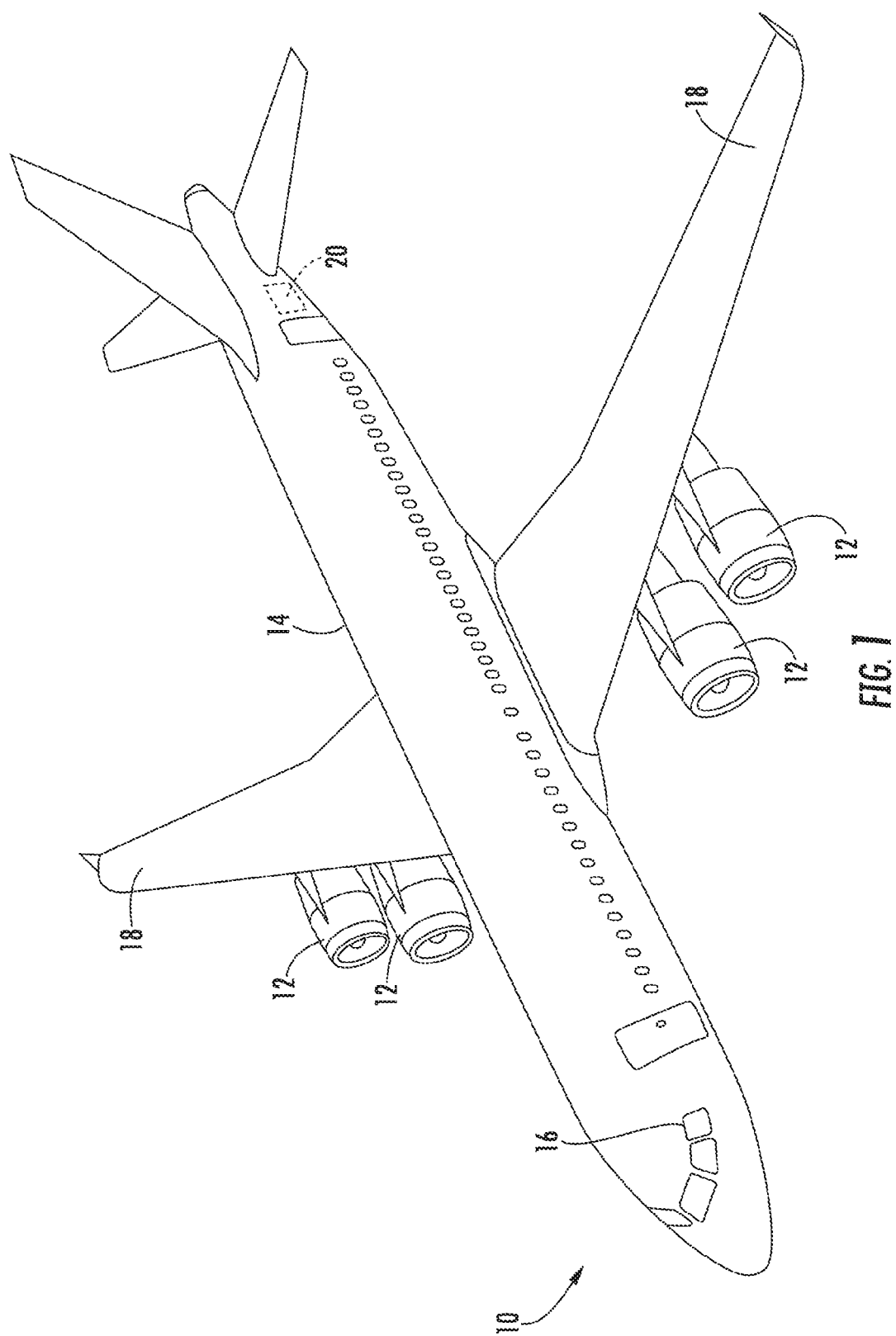
FIG. 1 depicts a perspective view of an aircraft having a power system according to example aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for providing electrical power for all the non-thrust electrical power requirements on an aircraft. A power system can include a first fuel cell configured to provide a base power to one or more loads on an aircraft. For example, the first fuel cell can be a solid oxide fuel cell (SOFC) or a molten carbonate fuel cell (MCFC). SOFCs, for example, can use a hydrogen rich synthesis gas to generate electricity at efficiencies at approximately 60%. The power system can also include a second fuel cell configured to provide peak power to the one or more loads on the aircraft. The peak power can be any power exceeding the base power provided by the first fuel cell. The second fuel cell can be, for example, a proton exchange membrane fuel cell (PEMFC), and alkaline fuel cell (AFC), a phosphoric acid fuel cell (PAFC), or a direct methanol fuel cell (DMFC). PEMFCs, for example, can have efficiencies up to approximately 50%. The power system can further include an energy storage device configured to provide transient power to the one or more loads on the aircraft. The transient power can be a power exceeding the peak power in the base power. For example, an energy storage device can be a battery, a capacitor, or a super capacitor. The power system can also include a controller configured to control delivery of power from the first fuel cell the second fuel cell and the energy storage device to the one or more loads on the aircraft.

The first fuel cell, such as a SOFC, may have a slow start up time, such as up to 40 minutes. Further, the first fuel cell may operate best with continuous loads due to on/off operational stresses on the internal structure of the fuel cell. Thus, the first fuel cell, such as an SOFC, can be used to provide a baseline power to the aircraft loads throughout the flight, such as while on the ground, during taxiing, takeoff, cruising, landing, and other operations. The second fuel cell, such as a PEMFC, can provide power to dynamic loads and peak loads. For example, a PEMFC may have a much quicker startup and shutdown time than the first fuel cell. For example a PEMFC can have a startup time of a few seconds to a few minutes, and therefore may be able to provide power to essential loads while the first fuel cell is warming up or when it is more cost effective or efficient to shut the first fuel cell down. The second fuel cell, such as a PEMFC, may have a limited response time to sudden load increases however. Thus the energy storage devices, such as batteries, capacitors, or supercapacitors, can provide transient power for sudden load increases to help mitigate the demands on the second fuel cell. The controller can be configured to control operation of the first fuel cell, the second fuel cell, and the energy storage device to meet the power demands of all loads on the aircraft. For example, the controller can be configured to determine a power demand for all loads of the aircraft, and selectively turn the first fuel cell, second fuel cell, and energy storage devices on to meet the demands of the loads on the aircraft.

In an embodiment, the power system can include a high voltage bus. For example, a high voltage bus can operate at 270 Volts DC. One or more high voltage loads can be coupled to the high voltage bus. The first fuel cell, such as an SOFC, can be coupled to a DC to DC converter, which can convert the electrical power from the first fuel cell to a high voltage power. The DC to DC converter can be coupled to the high voltage bus to provide high voltage power from the first fuel cell to the one or more high voltage loads connected to the high voltage bus. Similarly, the second fuel cell, such as a PEMFC, and the energy storage device, such as a battery or supercapacitor, can also be coupled to a DC to DC converter, which can also be coupled to the high voltage bus. In this way, the PEMFC can similarly be used to deliver a high voltage power to the one or more high voltage loads connected to the high voltage bus. In an embodiment, the power system can further include a low voltage bus. Another DC to DC converter can be electrically coupled to the high voltage bus in the low voltage bus to convert the high voltage power at the high voltage bus to a low voltage power at the low voltage bus. Further one or more low voltage loads can be connected to the low voltage bus, and low voltage power can be delivered to the low voltage loads through the low voltage bus.

In an embodiment, the power system can further include an AC network, such as a 115 V nominal AC network, configured to provide AC power to one or more AC loads on the aircraft. Further, the power system can include a DC to AC converter coupled between the high voltage bus and AC network. In this way, power from the first fuel cell, the second fuel cell, and the energy storage device can be delivered to any AC loads connected to the AC network.

The power system can further include a fuel reformer configured to convert a hydrocarbon fuel into a reformed fuel suitable for use by the first fuel cell. The first fuel cell can be configured to generate the base power using the reformed fuel. For example, the fuel reformer can be configured to convert aviation fuel into a hydrogen rich synthesis gas using the heat from the fuel cell and water.

The power system can further include a regenerative fuel cell configured to convert electric energy from one or more regenerative loads into a regenerative fuel suitable for use by the regenerative fuel cell. For example, the power system can include a regenerative bus electrically coupled to the high voltage bus. One or more regenerative loads, such as flight surfaces, landing gear, brakes, or wheels on the aircraft, can provide electrical power to the regenerative bus. The regenerative fuel cell can be configured to receive the electrical power from the one or more regenerative loads and convert the electrical power into a fuel, such as hydrogen. The power system can further include a compressor configured to compress the hydrogen generated by the regenerative fuel cell and a hydrogen tank configured to store hydrogen compressed by the compressor.

The power system can further include an emergency bus coupled to the regenerative bus. One or more essential loads can be coupled to the emergency bus to receive power from the emergency bus in an emergency situation. The essential loads can be, for example, any loads needed to operate the aircraft. For example, an aircraft control system needed to fly the aircraft can be configured to receive electrical power from the emergency bus in order to allow the aircraft control system to continue operating should the primary power system fail during flight of the aircraft. Further, the regenerative fuel cell can be configured to convert the regenerative fuel into electrical power, which can then be provided to the regenerative bus and further, to the emergency bus, to provide emergency power to the one or more essential loads coupled to the emergency bus. In an embodiment, the power system can further include a solid fuel storage unit, such as a solid hydrogen storage unit, wherein the regenerative fuel cell can be configured to generate the emergency power for the one or more essential loads from the solid fuel stored in the solid fuel storage unit. Further, in an embodiment, the regenerative bus can be coupled to the high voltage bus, and configured to receive electrical power from the high voltage bus.

In this way, the systems and methods according to example aspects of the present disclosure can have a beneficial effect of providing for increased efficiencies for electrical power generation on an aircraft. For instance, allocating all electrical loads to the power system, separate from the turbine engine, can remove the amount of variability of output load placed on the engine, thus allowing stall margins to be improved. Further, high electrical demand can be removed during take-off when maximum thrust is required thereby allowing engines on an aircraft to be designed for optimum propulsion.

Additionally, the thrust and fuel efficiency of the aircraft engines can be improved because electrical power extraction has been removed. Conventional systems have poor efficiencies on the ground while the power system described herein has an improved efficiency, and further can reduce CO emissions along with other pollution, including noise. The power system according to example aspects of the present disclosure is therefore environmentally cleaner than conventional aircraft engines in particular when on the ground at airports.

The availability of the aircraft electrical system can also be improved. Any loss of an engine or engines will not affect the power system. The modular design of the system offers high availability as well, as there can be multiple power sources providing redundant power, and fuel cells used in the power system can include multiple individual fuel cell units. An intelligent power management system, such as a controller, can be implemented to match the load demands against the dynamic availability of power such that a portion of the system can be turned off to reduce the peak load of the system at that time. The intelligent power management system can enable the power system to generate power efficiently to all areas requiring power at appropriate times.

Further, maintenance requirements on the aircraft can be decreased as the need to service the electrical system through the turbine engine can be eliminated, which can allow for a decrease in maintenance down-time. Finally, aircraft drag and vibration can be reduced when using emergency power, since an emergency power source can be implemented in the power system without adding a RAT that can increase drag and vibration.

With reference now to the FIGS., example embodiments of the present disclosure will be discussed in further detail. FIG. 1 depicts an aircraft 10 according to example aspects of the present disclosure. The aircraft 10 can include a power system 20, schematically illustrated. It should be understood that while the power system 20 described herein is by way of a non-limiting example in the context of an aircraft, power sources 20 are used in other industries such as marine and automotive industries.

The aircraft 10 can include multiple engines, including engines 12 which by way of non-limiting example can be turbojet engines, turbofan engines, or turboprop engines. Other engines 12 can be included in the power system 20. It should be understood that the engine 12 is a propulsion source and the power system 20 is separate and distinct from the engine 12. The aircraft can also include a fuselage 14, a cockpit 16 positioned in the fuselage 14, and wing assemblies 18 extending outward from the fuselage 14.

While a commercial aircraft 10 has been illustrated, it is contemplated that embodiments of the invention can be used in any type of aircraft 10. Further, while two engines 12 have been illustrated on the wing assemblies 18, it will be understood that any number of engines 12 including a single engine 12 on the wing assemblies 18, or even a single engine mounted in the fuselage 14 can be included.

Figure 2:
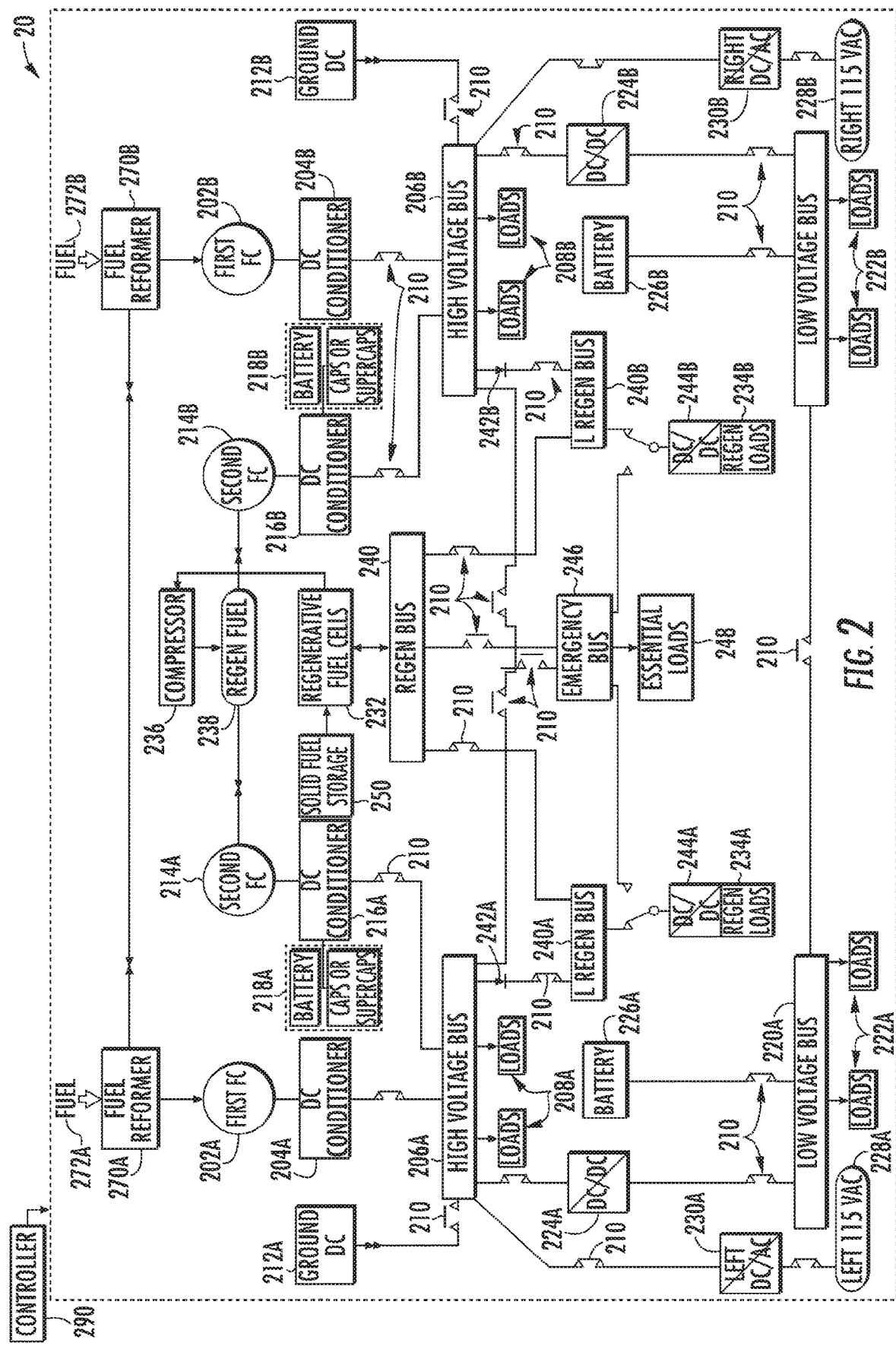
FIG. 2 depicts an architectural diagram of a power system according to example aspects of the present disclosure.

Referring now to FIG. 2, a power system 20 according to example aspects of the present disclosure is depicted. As depicted in FIG. 2, the power system 20 can include a plurality of power system elements, such as a first set of elements for a left side of the aircraft (designated as elements A) and a second set of elements for a right side of the aircraft (designated as elements B). One of ordinary skill in the art will recognize the power system 20 can include a single set of elements or a plurality of sets of elements without departing from the scope or spirit of the present disclosure.

As shown in FIG. 2, power system 20 can include a first fuel cell 202. First fuel cell 202 can be configured to provide a base power to one or more loads on the aircraft. First fuel cell 202 can be a solid oxide fuel cell (SOFC) or a molten carbonate fuel cell. For example, a SOFC can include two electrodes with an electrolyte in between which together forms a power output. Each electrode can be a thin porous electron conductor having a porosity that enables gas to diffuse from the electrodes outer surface to an electrolyte interface. The electrolyte in the SOFC enables movement of oxidant ions to the fuel as a fully dense oxygen ion conductor. The full density prevents the gaseous fuel from contact with air and burning. The SOFC can be made of any appropriate solid material and can be formed and rolled tubes. SOFCs can have efficiencies of approximately 60%, which can be increased to 75% if the oxidant exhaust and unburnt fuel is combusted to drive a turbine to compress the air required by the fuel cell.

The first fuel cell 202, such as a SOFC, can operate at a high operating temperature (such as 700 to 1000° C.) and can be run on a variety of light hydrocarbon fuels. For example, a SOFC can be used to generate electricity using a reformed aviation fuel. In an embodiment, a fuel reformer 270 can generate a reformed fuel, such as a hydrogen rich synthesis gas, from a hydrocarbon fuel 272, such as aviation fuel, using the heat from the first fuel cell 202 and water. The first fuel cell 202 can be configured to generate the base power using the reformed fuel.

The first fuel cell 202 can be electrically coupled to a DC to DC converter 204. For example, a DC to DC converter 204 can be a DC conditioner configured to condition the DC power output from the first fuel cell 202. The DC to DC converter 204 can be coupled to a high voltage bus 206. The high voltage bus can be operated at a voltage of, for example, 270 Volts DC. Other voltages can be used for a high voltage bus 206 as well. One or more high voltage loads 208 can be coupled to the high voltage bus 206. In this way electrical power generated by the first fuel cell 202 can be provided to the high voltage bus 206 which can in turn provide power to the high voltage loads 208. A switch 210 can selectively couple the first fuel cell 202 to the high voltage bus 206. A ground power cart 212 can also be electrically coupled to the high voltage bus 206. A switch 210 can selectively couple the ground power carts 212 to the high voltage bus 206. In an embodiment, the first fuel cell 202 can be directly coupled to the high voltage bus 206.

A second fuel cell 214 can also be included in power system 20. Second fuel cell 214 can be configured to provide peak power to one or more loads on the aircraft. The peak power can be a power exceeding the base power provided by the first fuel cell 202. The second fuel cell 214 can be a proton exchange membrane fuel cell (PEMFC), an alkaline fuel cell (AFC), a phosphoric acid fuel cell (PAFC), or a direct methanol fuel cell (DMFC). For example, a PEMFC can be up to 50% efficient at producing electricity, which can be increased if the waste heat is recycled. The second fuel cell, such as a PEMFC, can generate the peak power using, for example, a hydrogen fuel and an oxygen input. Further, the second fuel cell, such as a PEMFC, can be used to produce water for use on the aircraft. The second fuel cell, such as a PEMFC, can have a much quicker startup/shutdown time in the first fuel cell, such as a SOFC. For example, a PEMFC can have a startup time of a few seconds to a few minutes, which can be used to provide power to essential loads while the first fuel cell 202, such as a SOFC, is warming up or when it is more cost effective or efficient to shut the first fuel cell 202 down.

The second fuel cell 214 can be coupled to a DC to DC converter 216. For example, the DC to DC converter 216 can be a DC conditioner configured to condition the peak power generated by the second fuel cell 214. The DC to DC converter 216 can be coupled to the high voltage bus 206 to provide peak power to any high voltage loads 208 electrically coupled to the high voltage bus. A switch 210 can selectively couple the second fuel cell 214 to the high voltage bus 206. In an embodiment, the second fuel cell 214 can be directly coupled to the high voltage bus 206.

An energy storage device 218 can be configured to provide a transient power to one or more loads on the aircraft. The transient power can be a power exceeding the base power provided by the first fuel cell 202 and the peak power provided by the second fuel cell 214. The energy storage device 218 can be, for example, a battery, a capacitor, or a super capacitor. The energy storage device can be configured to provide the transient power for sudden load increases, such as load increases in which the limited response times of the first fuel cell 202 and second fuel cell 214 do not allow the first fuel cell 202 and second fuel cell 214 to meet the demands of the loads on the aircraft. The energy storage device 218 can be coupled to the high voltage bus 206. In an embodiment, the energy storage device 218 can be coupled to a DC to DC converter, such as the DC to DC converters 204 and 216. In an embodiment, the first fuel cell 202 and the second fuel cell 214 can be used to recharge the energy storage device 218. In an embodiment, the energy storage device 218 can be directly coupled to the high voltage bus 206.

The power system 20 can further include a low voltage bus 220. The low voltage bus 220 can be, for example, a bus operated at 28 volts DC. Other voltages can be used for a low voltage bus 220 as well. One or more low voltage loads 222 can be coupled to the low voltage bus 220. A DC to DC converter 224 can be coupled between the high voltage bus 206 in the low voltage bus 220 to convert power from the high voltage bus 206 to a low voltage power at the low voltage bus 220. One or more switches 210 can be configured to selectively couple the DC to DC converter 224 between the high voltage bus 206 in the low voltage bus 220. One or more energy storage devices 226, such as one or more batteries, can be selectively coupled to low voltage bus 220 by one or more switches 210.

An AC network 228 can also be included in power system 20. For example, AC network 228 can be a 115 V nominal AC network operating at 50 to 60 Hz. Other AC networks 228 operating at other voltages and/or frequencies can be used as well. One or more AC loads can be coupled to the AC network 228. For example, the AC network 228 can be accessible in a cabin of the aircraft 10 to allow one or more passengers on the aircraft 10 to power consumer devices, such as computers, cell phones, etc. A DC to AC converter 230 can be selectively coupled to high voltage bus 206 by one or more switches 210. The DC to AC converter 230 can be configured to convert high voltage power from the high voltage bus 206 to an AC power suitable for use on the AC network 228. In an embodiment, the AC network can be coupled to a DC to AC converter 230 coupled to the low voltage bus 220.

The power system 20 can also include a regenerative fuel cell 232. The regenerative fuel cell 232 can be configured to convert electric energy from one or more regenerative loads 234 on the aircraft 10 into a fuel suitable for use by the second fuel cell 214. For example, a regenerative fuel cell 232 can be configured to convert electric energy received from one or more regenerative loads 234 into hydrogen. For example, a regenerative fuel cell 232 can be configured to convert water into hydrogen gas. The regenerative fuel, such as hydrogen gas, from the regenerative fuel cell 232 can be compressed by a compressor 236. For example, hydrogen gas generated by a regenerative fuel cell 236 can be sent to the compressor 236 and compressed into compressed hydrogen. The power system can further include a hydrogen tank 238 configured to store the hydrogen compressed by the compressor 236. The hydrogen in the hydrogen tank 238 can be used by the second fuel cell 214 to generate electricity. In an embodiment, the regenerative fuel cell can be configured to generate other types of regenerative fuel as well.

The power system 20 can further include a regenerative bus 240. As depicted in FIG. 2, the regenerative bus 240 can include a left regenerative bus 240A and a right regenerative bus 240B. The left regenerative bus 240A can be coupled to the regenerative bus 240 by one or more switches 210. The right regenerative bus 240B can similarly be coupled to the regenerative bus 240 by one or more switches 210. One of ordinary skill in the art will recognize that the regenerative bus 240 can be a single regenerative bus 240 or any number of regenerative buses 240 electrically coupled together. The regenerative fuel cell 232 can be coupled to the regenerative bus 240. In an embodiment, the regenerative bus 240, such as a left regenerative bus 240A can be coupled to the high voltage bus 206, such as the high voltage bus 206A by one or more switches 210. In an embodiment, a current direction-limiting device, such as a diode, can prevent current from the regenerative bus 240, such as the left regenerative bus 240A, from flowing from the regenerative bus 240 to the high voltage bus 206.

In an embodiment, the regenerative loads 234 can be coupled to the regenerative bus 240 by one or more switches 210. In an embodiment, the regenerative loads 234 can be coupled to a DC to DC converter 244, such as a DC to DC conditioner, which can be coupled to the regenerative bus 240. An emergency bus 246 can be coupled to the regenerative bus 240 by one or more switches 210. Additionally and/or alternatively, emergency bus 246 can be coupled to the high voltage bus 206 by one or more switches 210. One or more essential loads 248, such as one or more loads necessary for operation of the aircraft, can be coupled to the emergency bus 246. During emergency conditions, such as when the first fuel cell 202 and second fuel cell 214 have failed, the regenerative fuel cell 232 can operate to produce electricity from the onboard regenerative fuel (e.g., solid, liquid, or gaseous hydrogen). The regenerative fuel cell 232 can be configured to generate an emergency power from the regenerative fuel. Further, the emergency power generated by the regenerative fuel cell 232 can be directed to the regenerative bus 240 and subsequently to the emergency bus 246 to allow emergency power to be provided to the essential loads 248. In an embodiment, the regenerative loads 234 can further be coupled to the emergency bus by one or more switches 210 such that the regenerative loads 234 can also be powered by the emergency bus 246. The power system 20 can further include a solid fuel storage unit 250 configured to store a solid fuel for use by the regenerative fuel cell 232 to generate the emergency power for the essential loads. For example, the solid fuel storage unit 250 can store hydrogen in a solid fuel, such as in a metal hydride, which can be used by the regenerative fuel cell 232 to generate the emergency power.

A controller 290 can be configured to control delivery of power from the first fuel cell 202, the second fuel cell 214, and the energy storage device 218 to the one or more loads on the aircraft 10, such as one or more high voltage loads 208, one or more low voltage loads 222, or one or more AC loads coupled to the AC network 228. The controller 290 can perform intelligent power management in order to enable the loading on the first fuel cell 202 to be kept relatively constant. Further, as one of the byproducts of the first fuel cell 202 is water, this will also enable a determinable quantity of water to be produced which can be used by other aircraft systems. Further, the controller 290 can also control the regenerative system (i.e., the regenerative fuel cell 234 regenerative bus 240 and regenerative loads 234) to ensure that all energy from the regenerative loads is either used or recovered, such as by using all regenerative power in resistive elements such as wing heaters, or converted and/or stored in one or more energy storage devices, such as one or more energy storage devices 218 or 226.

The power system 20 according to example aspects of the present disclosure can therefore supply all power needs on an aircraft 10, while increasing efficiencies as compared to conventional aircraft power systems (i.e., generators and APUs), while also producing power with fewer emissions. Moreover, the power system 20 according to example aspects of the present disclosure can allow for engines 12 on an aircraft, such as jet engines, to be operated in a manner to increase the efficiency and propulsion of the engines 12.

Figure 3:
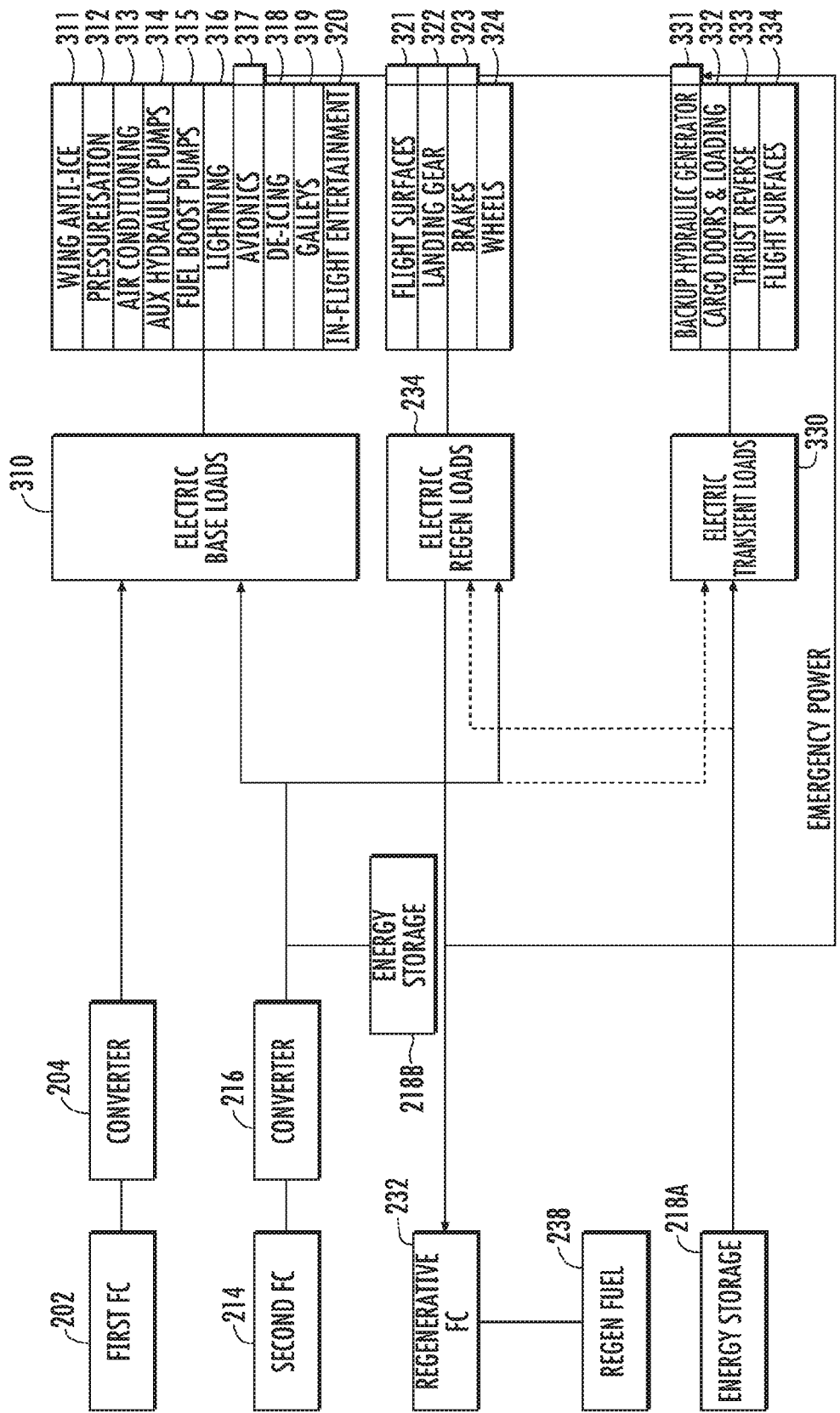
FIG. 3 depicts a diagram of load distributions of a power system according to example aspects of the present disclosure.

Referring now to FIG. 3, a diagram of the loads coupled to the individual components of the power source 20 is illustrated. The first fuel cell 202, the second fuel cell 214, the regenerative fuel cell 232, the regenerative fuel 238, and the energy storage device 218 are depicted. As shown the first fuel cell 202 can generate electricity which is converted by converter 204 and used to provide electric base power to electric base loads 310. For example, electric base power can be provided to wing anti-icers 311, pressurization 312, such as pressurization for the cabin of the aircraft 10, air-conditioning 313, auxiliary hydraulic pumps 314, fuel boost pumps 315, lighting 316, avionics 317, aircraft de-icing 318, galleys 319, and in-flight entertainment 320. Power from second fuel cell 214 can be converted by converter 216 which can also be used to power the electric base loads 310.

Regenerative loads 234 can provide electricity to regenerative fuel cell 232 which can convert the electricity into regenerative fuel 238. For example, electric regenerative loads 234 can include flight surfaces 321, landing gear 322, brakes 323, and wheels 324. Power to the regenerative loads 234 can be provided by the second fuel cell 214.

As shown, first energy storage device 218A can provide electrical power to electric transient loads 330. For example, electric transient loads can include a backup hydraulic generator 331, cargo doors and loading 332, thrust reverse 333, and flight surfaces 334. Additionally, as shown by the dotted line, first energy storage device 218A can provide power to the electric regenerative loads 234. Additionally, as shown by the dotted line, second fuel cell 214 can provide some power to the electric transient loads 330. Second energy storage device 218B can provide power to electric base loads 310, electric regenerative loads 234, and electric transient loads 330, as indicated by the dotted line.

Regenerative fuel cell 232 can use the regenerative fuel 238 to generate emergency power which can be provided to essential loads 248. For example, regenerative fuel cell 232 can provide emergency power to backup hydraulic generator 331, brakes 323, landing gear 322, flight surfaces 321, and avionics 317.

Figure 4:
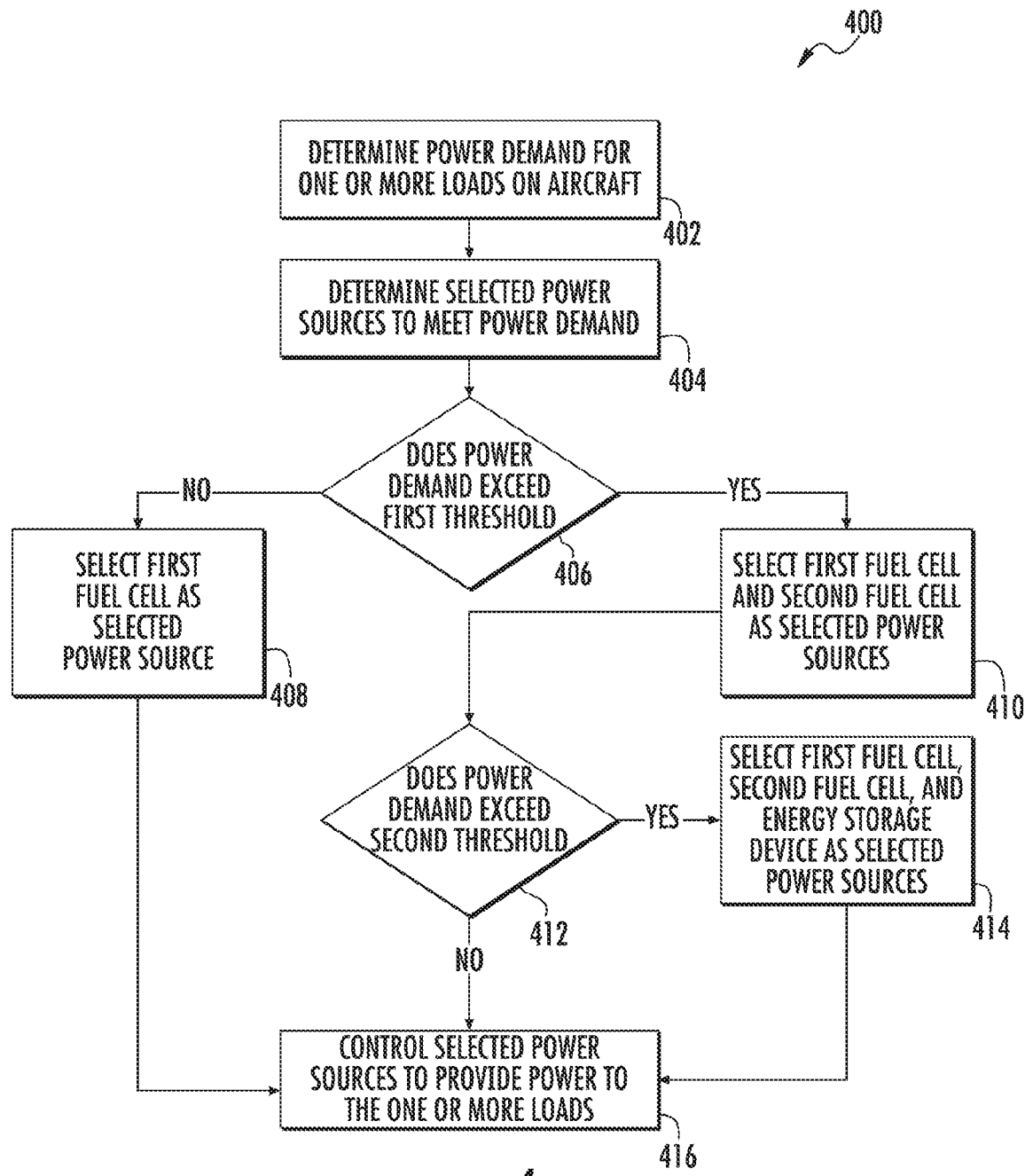
FIG. 4 depicts an example method according to example aspects of the present disclosure.

Referring now to FIG. 4, a flow diagram of an example method (400) of providing power to one or more loads on an aircraft according to example embodiments of the present disclosure is depicted. The aircraft can be an aircraft 10, which can include a power system 20. The power system 20 can include a first fuel cell 202 configured to provide a base power. The power system 20 can further include a second fuel cell 214 configured to provide a peak power. The power system 20 can further include an energy storage device 218 configured to provide a transient power. The peak power can be a power exceeding the base power, and the transient power can be a power exceeding the peak power. The power system 20 can be configured to provide power to one or more loads on the aircraft. The method (400) can be implemented by one or more controllers, such as a computing system 500 depicted in FIG. 5. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method (400) can include determining, by a controller, a power demand for the one or more loads on an aircraft. The one or more loads on the aircraft can be, for example, one or more high voltage loads 208, one or more low voltage loads 222, or one or more AC loads 228. The controller, such as a controller 290, can be configured to determine the power demand based on the type and quantity of loads connected to the power system 20. For example, one or more signals can be provided to the controller 290 indicative of loads connected to the power system 20 by one or more sensors and/or one or more aircraft control systems, such as an avionics system. Moreover, one or more lookup tables can be used to determine a total power demand from the loads connected to the power system 20. In an embodiment, the controller 290 can be configured to determine the power demand based at least in part on a historical power demand for various loads connected to the power system 20.

At (404), the method (400) can include determining, by the one or more controllers, one or more selected power sources from the power system needed to meet the power demand. For example, the controller 290 can be configured to determine the one or more power sources needed to meet the power demand based at least in part on a type of power to be provided or a type of loads connected to the power system 20, such as whether the loads are an electric base load 310, a regenerative load 234, a transient load 330, or another parameter of the load. For example, the controller 290 can be configured to select a first fuel cell 202 to provide power to an electric base load 310. The controller 290 can further be configured to select the power sources to meet the power demand based on the amount of power needed to power the loads connected to the power system 20. For example, if a power demand exceeds the power capacity of a single fuel cell, such as a first fuel cell 202, the controller can be configured to select a first fuel cell 202 and a second fuel cell 214. Further, the controller 290 can be configured to select power sources to meet the power demand based on an availability of the power sources in the power system 20. For example, the controller 290 can be configured to select a second fuel cell 214 or an energy storage device 218 to provide a transient power to the one or more loads in the power system 20 during periods in which a first fuel cell 202 is in a startup phase, and therefore unavailable to provide power.

At (406), the method (400) can include determining whether the power demand exceeds a first threshold. For example, a first threshold can be a power capacity of a first fuel cell 202. At (408), if the power demand does not exceed the first threshold, the controller 290 can select the first fuel cell 202 as the selected power source. At (410), if the power demand does exceed the power capacity of the first fuel cell 202, the controller 290 can select the first fuel cell 202 and/or the second fuel cell 214 as the selected power sources. Similarly, the first threshold can be an availability of the first fuel cell 202, a type of power, such as a baseload power, a peak power, or a transient power or another parameter of the ability of the first fuel cell 202 to provide power to meet the power demand. For example, if a first fuel cell 202 is not available to provide power, such as during a startup phase of the first fuel cell 202, the first threshold can be zero, and the second fuel cell 214 can be selected to provide power to the one or more loads.

At (412), the method (400) can include determining whether the power demand exceeds a second threshold. For example, a second threshold can be a power capacity of a first fuel cell 202 and a second fuel cell 214. At (414), if the power demand exceeds the second threshold, the controller 290 can select the first fuel cell 202, the second fuel cell 214, and the energy storage device 218 as the selected power sources. However, if the power demand does not exceed the power capacity of the first fuel cell 202 and the second fuel cell 214, the controller 290 can select the first fuel cell 202 and the second fuel cell 214 as the selected power sources. As with the first threshold, the second threshold can be an availability the first fuel cell 202 and second fuel cell 214, a type of power, such as a baseload power, a peak power, or a transient power or another parameter of the ability of the first fuel cell 202 and second fuel cell 214 to provide power to meet the power demand.

At (416), the method (400) can include controlling, by the one or more controllers, the one or more selected power sources to provide power to the one or more loads on the aircraft. For example, a controller 290 can be configured to operate one or more switches 210 to connect the one or more selected power sources to one or more buses, such as a high voltage bus 206, a low voltage bus 220, or an AC network 228 in order to provide power to the one or more loads on an aircraft 10. Further, the controller 290 can be configured to measure and direct power flows between various elements of the power system, such as directing power from a high voltage bus 206 to a low voltage bus 220 or converting power from a high voltage bus 206 to power suitable for use on AC network 228 by using one or more converters in the power system 20. In this way, the controller 290 can control the selected power source(s) to provide power to the one or more loads on an aircraft 10.

Figure 5:
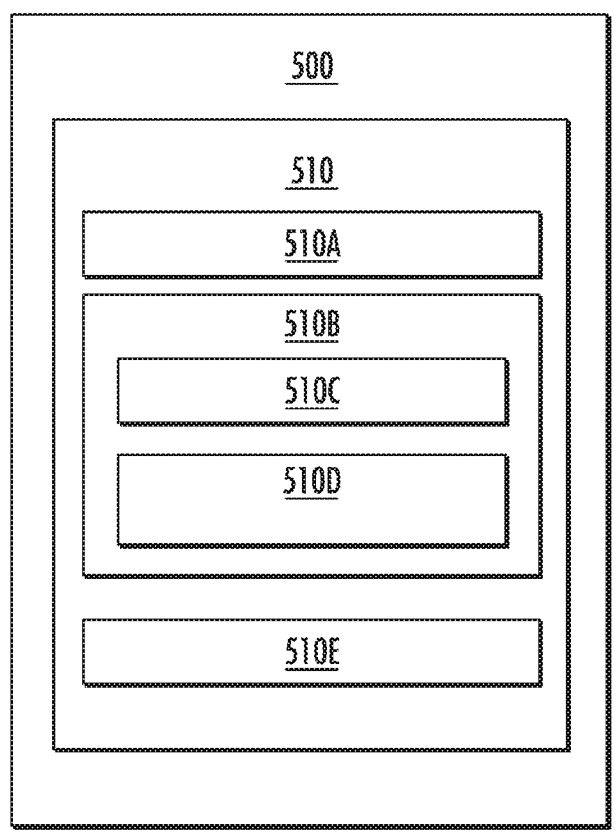
FIG. 5 depicts a computing system according to example aspects of the present disclosure.

FIG. 5 depicts an example computing system 500 according to example embodiments of the present disclosure. The computing system 500 can be used, for example, as a controller 290 in a power system 20. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for providing power to one or more loads on an aircraft (e.g, method 400), as described herein, and/or any other operations or functions of the one or more computing device(s) 510. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a power system 20, data indicative of power capacities of first fuel cells 202, second fuel cells 214, and energy storage devices 218, any user input, such as which loads demand power, and/or any other data and/or information described herein.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A power system for an aircraft, comprising:
a first fuel cell configured to provide base power to one or more loads on the aircraft;
a second fuel cell configured to provide peak power to the one or more loads on the aircraft, wherein the peak power comprises power exceeding the base power;
an energy storage device configured to provide transient power to the one or more loads on the aircraft, wherein the transient power comprises power exceeding the peak power; and
a controller configured to control delivery of power from the first fuel cell, the second fuel cell, and the energy storage device to the one or more loads on the aircraft.

2. The power system of claim 1, wherein the first fuel cell comprises a solid oxide fuel cell or a molten carbonate fuel cell.

3. The power system of claim 1, wherein the second fuel cell comprises a proton exchange membrane fuel cell, an alkaline fuel cell, a phosphoric acid fuel cell, or a direct methanol fuel cell.

4. The power system of claim 1, wherein the energy storage device comprise one of a battery, a capacitor, or a supercapacitor.

5. The power system of claim 1, wherein the one or more loads on the aircraft comprise one or more high voltage loads, the power system further comprising:
a high voltage bus configured to deliver a high voltage power to the one or more high voltage loads on the aircraft coupled to the high voltage bus; and
one or more DC to DC converters coupled between the first fuel cell, the second fuel cell, or the energy storage device and the high voltage bus.

6. The power system of claim 5, wherein the one or more loads on the aircraft further comprise one or more low voltage loads, the power system further comprising:
a low voltage bus configured to deliver a low voltage power to the one or more low voltage loads on the aircraft coupled to the low voltage bus; and
one or more DC to DC converters coupled between the high voltage bus and the low voltage bus.

7. The power system of claim 5, wherein the one or more loads on the aircraft further comprise one or more AC loads, the power system further comprising:
an AC network configured to deliver an AC power to the one or more AC loads on the aircraft coupled to the AC network; and
one or more DC to AC converters coupled between the high voltage bus and the AC network.

8. The power system of claim 1, further comprising:
a fuel reformer configured to reform a hydrocarbon fuel into a reformed fuel suitable for use by the first fuel cell, wherein the first fuel cell is configured to generate the base power using the reformed fuel.

9. The power system of claim 1, further comprising:
a regenerative fuel cell, wherein the regenerative fuel cell is configured to convert electric energy from one or more regenerative loads on the aircraft into a regenerative fuel suitable for use by the regenerative fuel cell.

10. The power system of claim 9, wherein the regenerative fuel cell is further configured to convert electric energy from the one or more regenerative loads on the aircraft into a fuel suitable for use by the second fuel cell.

11. The power system of claim 9, wherein the regenerative fuel comprises hydrogen.

12. The power system of claim 11, further comprising:
a compressor configured to compress hydrogen generated by the regenerative fuel cell; and
a hydrogen tank configured to store hydrogen compressed by the compressor.

13. The power system of claim 8, further comprising:
a regenerative bus, wherein the regenerative fuel cell is coupled to the regenerative bus;
an emergency bus coupled to the regenerative bus; and
one or more essential loads coupled to the emergency bus;
wherein the regenerative fuel cell is further configured to generate an emergency power for the essential loads from the regenerative fuel.

14. The power system of claim 13, further comprising:
a solid fuel storage unit configured to store a solid fuel for use by the regenerative fuel cell; and
wherein the regenerative fuel cell is further configured to generate the emergency power for the essential loads from the solid fuel.

15. The power system of claim 13, wherein the regenerative bus is coupled to the high voltage bus; and
wherein the regenerative bus is configured to receive power from the high voltage bus.

16. A method of providing power to one or more loads on an aircraft, the aircraft comprising power system, the power system comprising a first fuel cell configured to provide a base power, a second fuel cell configured to provide a peak power, and an energy storage device configured to provide a transient power, the peak power comprising a power exceeding the base power, the transient power comprising a power exceeding the peak power, the method comprising:
determining, by one or more controllers, a power demand for the one or more loads on the aircraft;
determining, by the one or more controllers, one or more selected power sources from the power system needed to meet the power demand; and
controlling, by the one or more controllers, the one or more selected power sources to provide power to the one or more loads on the aircraft;
wherein the first fuel cell comprises a solid oxide fuel cell or a molten carbonate fuel cell;

wherein the second fuel cell comprises a proton exchange membrane fuel cell, an alkaline fuel cell, a phosphoric acid fuel cell, or a direct methanol fuel cell; and wherein the energy storage device comprises a battery, a capacitor, or a supercapacitor.

17. The method of claim 16, wherein the first fuel cell is configured to provide power up to a first threshold, wherein when the power demand does not exceed the first threshold, determining, by the one or more controllers, one or more selected power sources from the power system needed to meet the power demand comprises selecting the first fuel cell as the selected power source, and controlling, by the one or more controllers, the one or more selected power sources to provide power to the one or more loads on the aircraft comprises controlling the first fuel cell to provide power to the one or more loads on the aircraft.

18. The method of claim 17, wherein the first fuel cell and the second fuel cell are configured to provide power up to a second threshold, wherein when the power demand exceeds the first threshold but not the second threshold, determining, by the one or more controllers, one or more selected power sources from the power system needed to meet the power demand comprises selecting the first fuel cell and the second fuel cell as the selected power sources, and controlling, by the one or more controllers, the one or more selected power sources to provide power to the one or more loads on the aircraft comprises controlling the first fuel cell and second fuel cell to provide power to the one or more loads on the aircraft.

19. The method of claim 18, wherein the first fuel cell, the second fuel cell, and the energy storage device are configured to provide power above a second threshold, wherein when the power demand exceeds the second threshold, determining, by the one or more controllers, one or more selected power sources from the power system needed to meet the power demand comprises selecting the first fuel cell, the second fuel cell, and the energy storage device as the selected power sources and controlling, by the one or more controllers, the one or more selected power sources to provide power to the one or more loads on the aircraft comprises controlling the first fuel cell, second fuel cell, and the energy storage device to provide power to the one or more loads on the aircraft.

20. An aircraft, comprising:

a fuselage;

one or more wing assemblies;

at least one engine configured for propulsion of the aircraft;

a power system, comprising:

a first fuel cell configured to provide base power to one or more loads on the aircraft, the first fuel cell comprising a solid oxide fuel cell or a molten carbonate fuel cell, the one or more loads comprising one or more high voltage, low voltage, or AC loads;

a second fuel cell configured to provide peak power to the one or more loads on the aircraft, wherein the peak power comprises power exceeding the base power, the second fuel cell comprising a proton exchange membrane fuel cell, an alkaline fuel cell, a phosphoric acid fuel cell, or a direct methanol fuel cell;

an energy storage device configured to provide transient power to the one or more loads on the aircraft, wherein the transient power comprises power exceeding the peak power, the energy storage device comprising a battery, a capacitor, or a supercapacitor; and a controller configured to control delivery of power from the first fuel cell, the second fuel cell, and the energy storage device to the one or more loads on the aircraft.

* * * * *